United States Patent [19]
Gomyo et al.

[11] Patent Number: 6,010,246
[45] Date of Patent: Jan. 4, 2000

[54] HYDRODYNAMIC BEARING APPARATUS AND METHOD OF MANUFACTURING IT

[75] Inventors: Masato Gomyo; Otohiko Imamura, both of Nagano, Japan

[73] Assignee: Sankyo Seiki Mfg. Co., Ltd., Nagano-ken, Japan

[21] Appl. No.: 08/735,672

[22] Filed: Oct. 23, 1996

[30]   Foreign Application Priority Data

Oct. 25, 1995 [JP] Japan .................................. 7-300659
Nov. 8, 1995 [JP] Japan .................................. 7-314735

[51] Int. Cl.[7] ........................................................ F16C 33/06
[52] U.S. Cl. ................................................ 384/115; 384/292
[58] Field of Search ........................................ 384/107, 278, 384/113, 115, 120, 292

[56]        References Cited

U.S. PATENT DOCUMENTS

| | | | |
|---|---|---|---|
| 5,407,281 | 4/1995 | Chen et al. | 384/107 |
| 5,558,445 | 9/1996 | Chen et al. | 384/107 |
| 5,634,724 | 6/1997 | Zang et al. | 384/107 |
| 5,683,183 | 11/1997 | Tanaka et al. . | |

*Primary Examiner*—Lenard A. Footland
*Attorney, Agent, or Firm*—McAulay Nissen Goldberg Kiel & Hand, LLP

[57]        ABSTRACT

A hydrodynamic bearing apparatus comprises a shaft and a bearing having facing hydrodynamic surfaces therebetween. Hydrodynamic pressure generating grooves are disposed on at least one of the facing hydrodynamic surfaces of the shaft and bearing. The apparatus relatively rotatably supports the shaft and bearing by the hydrodynamic pressure from a lubricant fluid filled between the facing hydrodynamic surfaces. One of the shaft and bearing, on which the hydrodynamic pressure generating grooves are formed, are made of a metallic material whose thermal expansion coefficient is smaller than that of a copper containing material. A working layer made of the copper containing material is formed on the hydrodynamic surface side of the metallic material. The surface of the working layer functions as the hydrodynamic surface. The hydrodynamic pressure generating grooves are formed on the working layer.

14 Claims, 5 Drawing Sheets

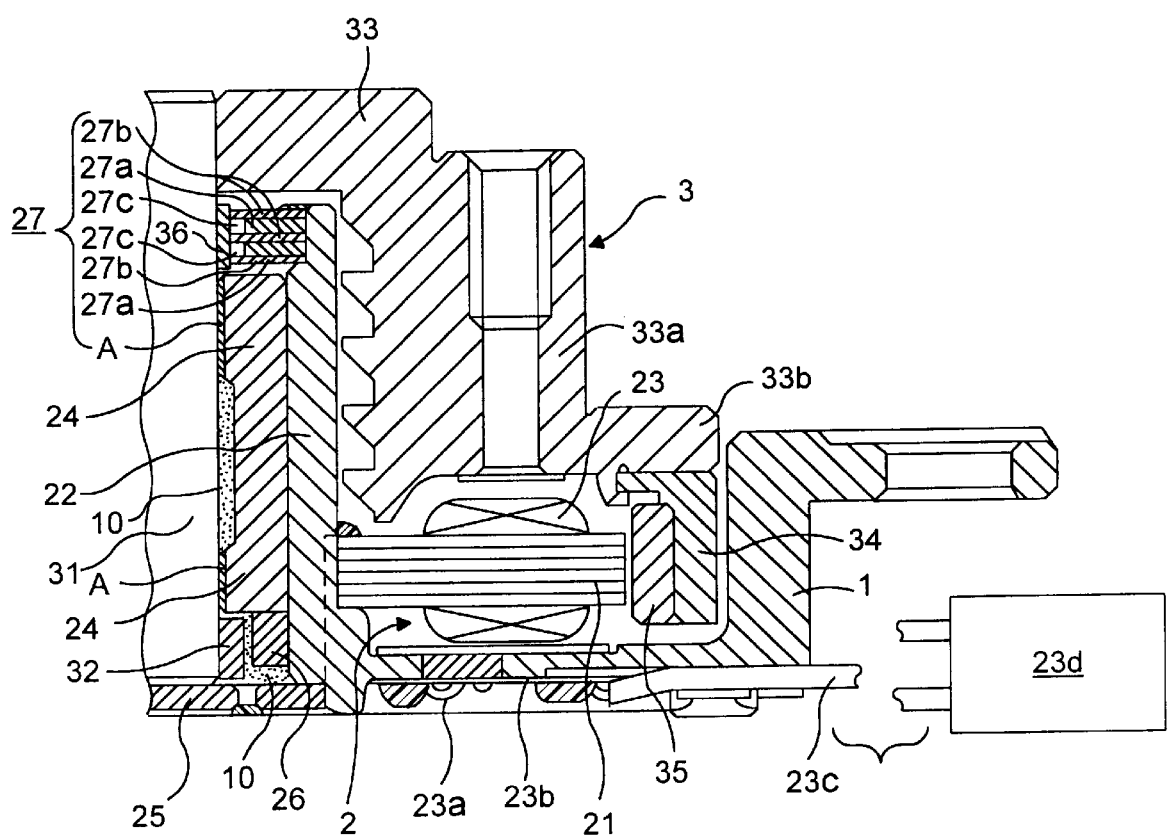
F I G. 1

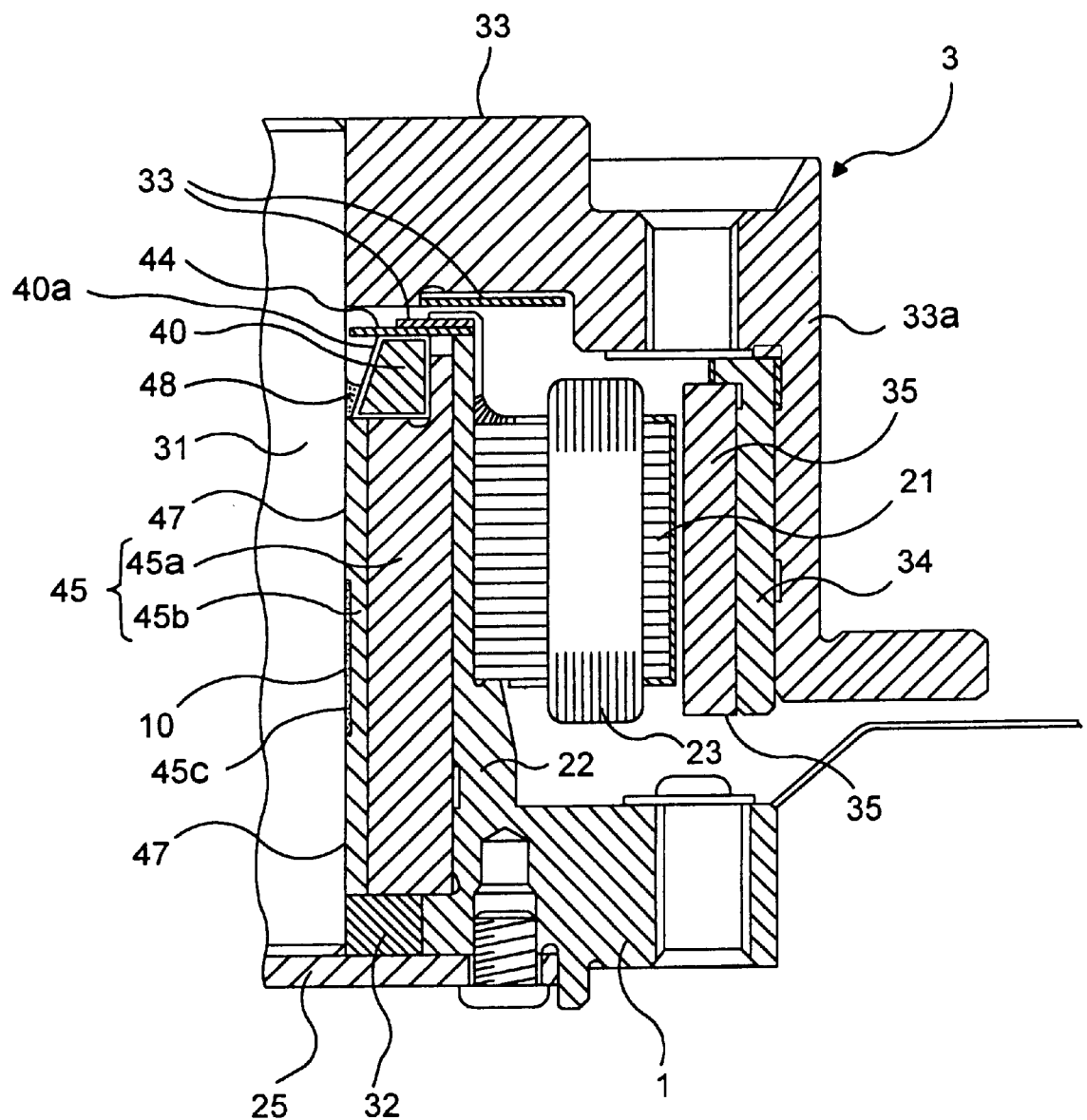
F I G. 2

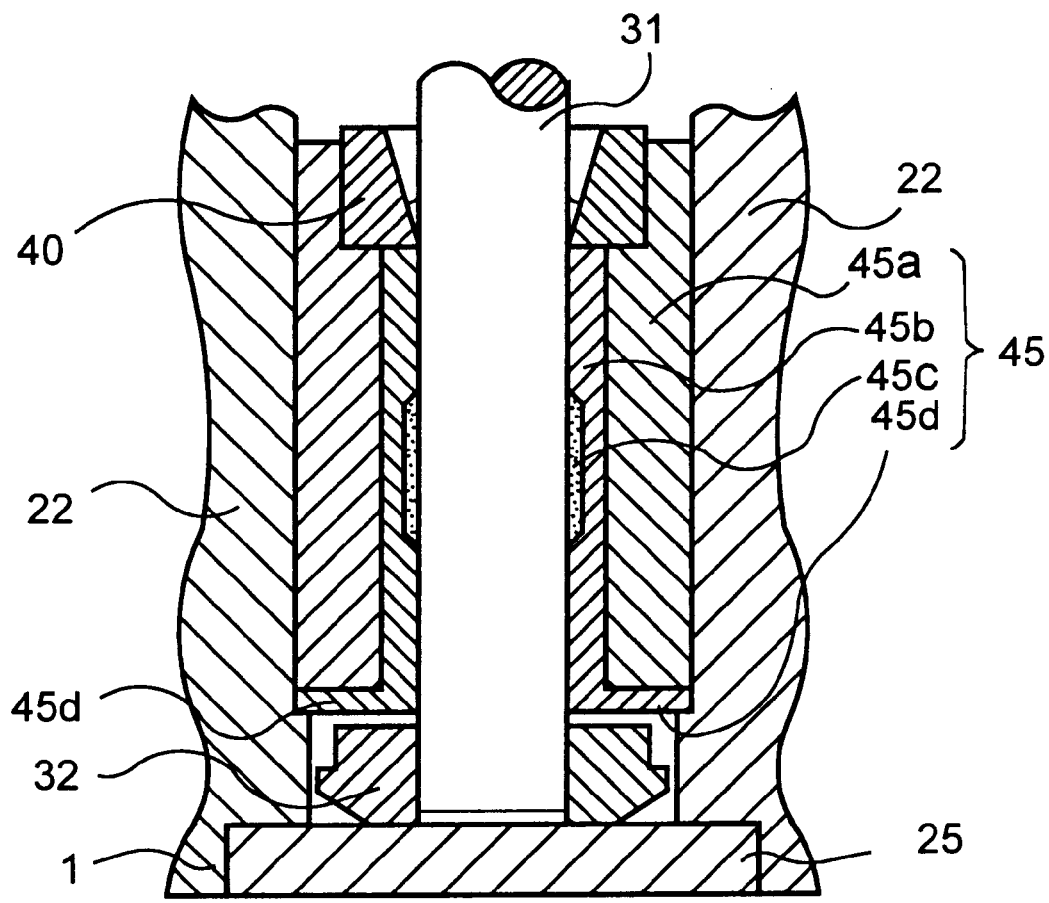
F I G. 3

HYDRODYNAMIC BEARING APPARATUS AND METHOD OF MANUFACTURING IT

BACKGROUND OF THE INVENTION a) Field of the Invention

This invention relates to a hydrodynamic bearing apparatus which relatively rotatably supports a shaft and a bearing via hydrodynamic pressure generated by a lubricant filled in a bearing clearance.

b) Description of the Related Art

Conventionally, various types of hydrodynamic bearing apparatus are known which relatively rotatably support a shaft and a bearing via hydrodynamic pressure generated by a lubricant for the bearing For example, in the hydrodynamic bearing apparatus used for a spindle motor for a driving disk, and the like, a lubricant (lubricant fluid) consisting of oil and the like is filled between the facing hydrodynamic surfaces of a metal, which is made of copper or copper alloy and used as a radial bearing, and a shaft made of alloy steel and the like, such as stainless steel containing chrome, to form a noncontact abrasive section with the hydrodynamic pressure of the lubricant fluid.

In the hydrodynamic bearing apparatus mentioned above, the shaft contacts the bearing at the initial stage of rotation, and therefore, the material wears down due to "galling" and "burning." To reduce the level of wearing-out, a relatively soft material such as copper or copper alloy is used to construct the bearing. In addition to using copper or copper alloy for a bearing, using an alloy steel such as stainless steel for a shaft, the level of wearing-out can be reduced; and because copper or copper alloy is easy to machine in general, the hydrodynamic pressure generating grooves and the like on the inner circle surface of the bearing can be machined easily. Nevertheless, the difference in thermal expansion coefficient for the bearing and the shaft in the above mentioned configuration varies the so-called bearing clearance therebetween according to the change in environmental temperature; it also varies the viscosity of the lubricant fluid, resulting in fluctuation of bearing properties.

To resolve the problems such as the bearing clearance variation due to the changes in environmental temperature and the viscosity fluctuation in the lubricant fluid, a steel material such as stainless steel (SUS) or free-machining steel (SUM24L) whose linear expansion coefficient is small, is used for a bearing so that the excellent bearing properties can be kept regardless of the changes in environmental temperature.

The above mentioned hydrodynamic bearing apparatus, however, uses a steel material having a low expandability and a small linear expansion coefficient; therefore, it causes severe wearing-out due to galling and burning. Also, since the material is not easy to machine, it is difficult to machine precisely the hydrodynamic pressure generating grooves and the like into the inner surface of the bearing. Especially obtaining a precise surface roughness, flatness, and the like is difficult. In the worst case, even the bearing properties are deteriorated.

OBJECT AND SUMMARY OF THE INVENTION

The present invention primarily aims to provide a hydrodynamic bearing apparatus and its manufacturing method, with which the changes in hydrodynamic pressure and bearing loss caused by the change in environmental temperature are reduced while obtaining a predetermined hydrodynamic pressure constantly as well as a good processability.

In accordance with the present invention, a hydrodynamic bearing apparatus comprises a shaft and a bearing having facing hydrodynamic surfaces therebetween. Hydrodynamic pressure generating grooves are disposed on at least one of the facing hydrodynamic surfaces of the shaft and bearing. The apparatus relatively rotatably supports the shaft and bearing by the hydrodynamic pressure from a lubricant fluid filled between the facing hydrodynamic surfaces. One of the shaft and bearing, on which the hydrodynamic pressure generating grooves are formed, are made of a metallic material whose thermal expansion coefficient is smaller than that of a copper containing material. A working layer made of the copper containing material is formed on the hydrodynamic surface side of the metallic material. The surface of the working layer functions as the hydrodynamic surface. The hydrodynamic pressure generating grooves are formed on the working layer.

BRIEF DESCRIPTION OF THE DRAWINGS

In the drawings:

FIG. 1 illustrates a cross-sectional schematic drawing of a half of a major section, in which a hydrodynamic bearing apparatus of this invention is applied to a spindle motor;

FIG. 2 illustrates a half horizontal cross-sectional schematic drawing illustrating a half the spindle motor of another embodiment of this invention;

FIG. 3 shows a partial horizontal cross-sectional view illustrating a modified embodiment of the embodiment of FIG. 2;

DESCRIPTION OF THE PREFERRED EMBODIMENTS

Figure 4:
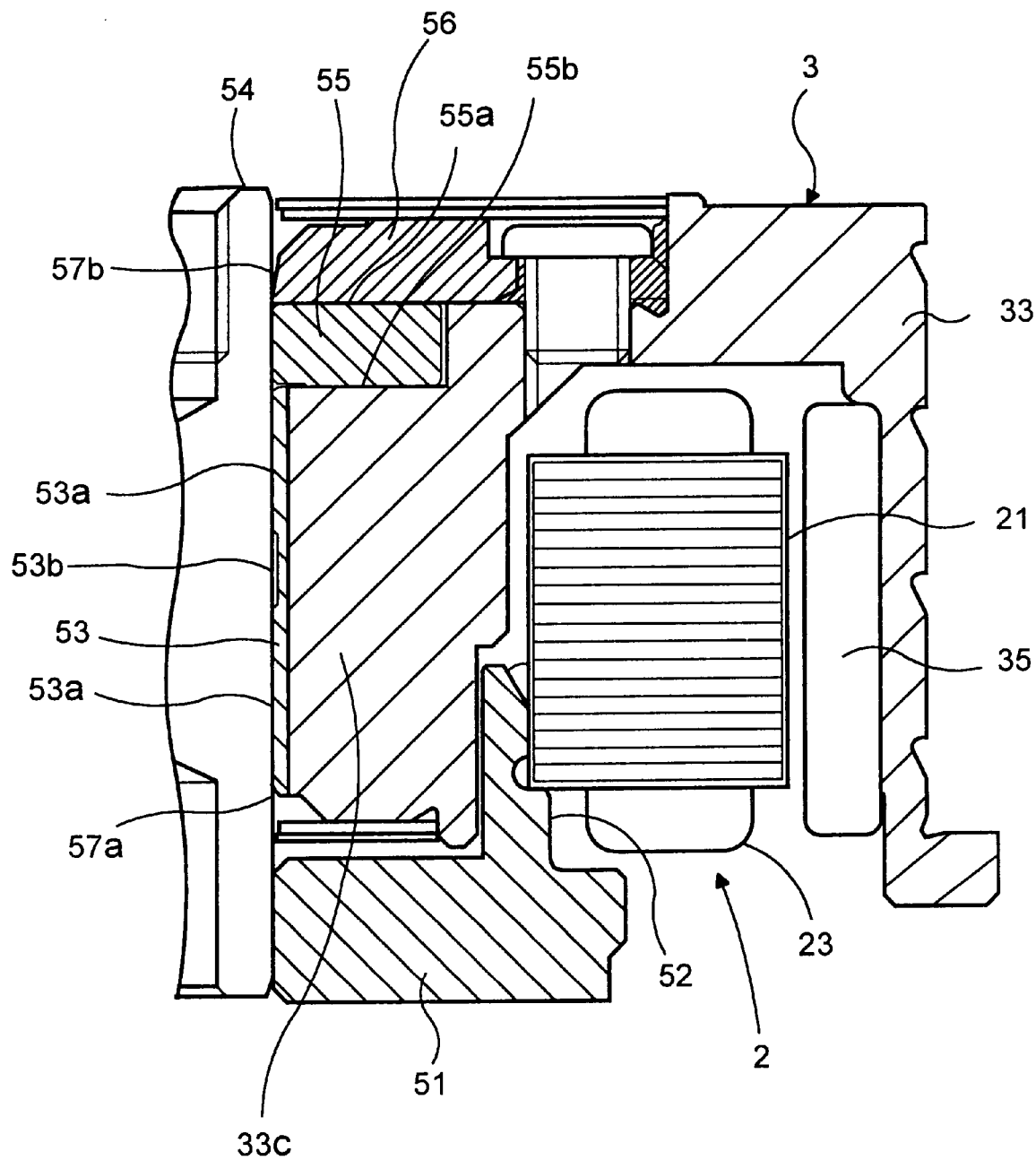
FIG. 4 is a half horizontal cross-sectional schematic drawing illustrating a half of a spindle motor of another embodiment of this invention.

Embodiments, in which this invention is applied to a HDD spindle motor of shaft rotation type, are described hereafter based on the figures.

A spindle motor for driving a hard disk, illustrated in FIG. 1, comprises a stator assembly 2, which is a fixed member made of an aluminum containing material and installed on a frame 1 side, and a rotor assembly 3, which is a rotation member assembled from the top over the stator assembly 2. A stator core 21 constituting the stator assembly 2 is fixed on the outer circle of a cylindrical bearing holder 22 which is arranged in the center of the frame 1, and a wire 23 is wound around a salient pole of the stator core 21. On the inner circle of the bearing holder 22, radial bearings 24 and 24 is formed, which are integrally formed with each other, at a predetermined interval in the axial direction. A rotation shaft 31 is rotatably supported by the pair of radial bearings 24 and 24. That is, the inner circle surfaces of the radial bearings 24 and 24 constitute abrasive sections which do not contact the outer circle surface of the rotation shaft 31 beyond a predetermined amount of a lubricant fluid 10; a hydrodynamic surface in the radial direction is constituted by the inner circle surface of the radial bearing 24 and the outer circle surface of the rotation shaft 31.

Regarding the material used for the rotation shaft 31, a magnetic metallic material such as stainless steel which is a steel alloy containing chrome is used. Those materials having a linear expansion coefficient of 9–12PPM/° C. or more, specifically, such magnetic SUS materials as the one having a thermal expansion coefficient of 9.8 PPM/° C. are used. The radial bearing 24 is also formed of a magnetic steel material whose thermal expansion coefficient is smaller than that of copper alloy, such as alloy steel which is also called a nickel alloy, containing nickel. As for the steel material for nickel alloy, for example, Fe—Ni alloy (invar) or Fe—Ni—Co alloy (super-invar) is used. In the above embodiment, a stainless steel is used for the rotation shaft 31 and Fe—Ni alloy (invar) is used for the radial bearing 24; however, these materials may be interchanged or the same type of material may be used for both.

A working layer A made of copper or copper alloy which is easy to machine is formed by plating or depositing on the inner circle surface of the radial bearing 24 which faces the rotation shaft 31, to form a hydrodynamic surface thereon. As the copper or copper alloy forming the working layer A is used Cu (copper), Cu—Sn alloy (bronze), Cu—Ni alloy (nickel), Cu—Zn alloy (brass), or Cu—Zn—Sn alloy (zinc-bronze), but other copper alloys may be used as well.

The working layer A formed by plating or depositing mentioned above, whose surface is a hydrodynamic surface arranged opposite the rotation surface 31, is preferably given the thickness of 10–100μm, based on the depth of the hydrodynamic pressure generating grooves for generating the hydrodynamic action. That is, for example, herringbone-configured hydrodynamic pressure generating grooves are formed as a hydrodynamic pressure generating means on the working layer A at a plurality of appropriate locations. The depth of the grooves is normally set to be 6–10μm in order to excellently generate hydrodynamic pressure in the bearing fluid. For this reason, it is preferred that the thickness of the working layer A is larger than the depth of the hydrodynamic pressure generating grooves, and the grooves including the deepest section are formed within the working layer A. However, the thickness of the working layer A is not limited to the above values, but may also be shallower than the hydrodynamic pressure generating grooves. In this case, the pretreatment before grooving the hydrodynamic pressure generating grooves requires precision work on the inner surface of the bearing. However, even if the thickness of the working layer A is not as large as the depth of the hydrodynamic pressure generating grooves, the above mentioned working layer A provides an easy method for effectively machining the inner surface of the bearing.

The tip (the bottom in the figure) of the rotation shaft 31 slidably contacts a thrust receiving plate 25 which covers the opening of the bearing holder 22 illustrated at the lower side in the figure. A hydrodynamic lubrication surface in the thrust direction is constituted of these surfaces, the tip of the rotation shaft 31 and the receiving side of the thrust receiving plate 25. At the tip of the rotation shaft 31 is fixed a sword-guard-shaped stopper 32 which prevents the rotor assembly 3 from falling from the stator assembly 2 side. The stopper 32 is formed of an annular magnetic ring, and an annular magnet 26 is provided on the inner circle wall of the bearing holder 22 so that the annular magnet 26 faces the outer peripheral surface of the stopper 32 to form a magnetic path for holding the lubricant fluid 10.

At the outer end in the axial direction (the upper end in the figure) of the rotation shaft 31 is fixed a hub 33 constituting the rotor assembly 33 so that they rotate integrally. The hub 33, formed of an aluminum containing material, has a cylindrical sleeve 33a which secures a plurality of magnetic disks on its outer circle and a mount section 33b at a lower end in the figure of the sleeve 33a. A driving magnet 35 is provided annularly around the mount section 33b, which is arranged opposite the stator core 21 via a back yoke 34.

A terminal wire 23a comes from the wire 23 wound around the stator core 21, and is soldered at a predetermined position (a soldering land) of a flexible printed board 23b on which a conductor pattern is printed. At the end of the conductor pattern on the flexible printed board 23b is connected one end of a flexible lead wire 23c; the other end of the flexible lead wire 23c is extended outside of the motor and is connected to a power supply means 23d. By impressing a predetermined driving voltage on the wire 23 using the power supply means 23d outside the motor, via the flexible lead wire 23c, conductor pattern, and terminal wire 23a, the hub 33 in which the magnetic disk is installed, is driven.

A magnetic fluid seal 27 for preventing the lubricant fluid from leaking is provided at the opening of the bearing holder 22 at the upper end in the figure. The magnetic fluid seal 27 has two magnets 27a and 27a arranged annularly against the inner circle wall of the bearing holder 22; and pole pieces 27b, 27b, and 27b are provided on both end surfaces of each annular magnets 27a in the axial direction. The magnetic fluid 27c is retained between the inner circle edge of each pole piece 27b and the outer circle surface of the rotation shaft 31, to obtain a sealing function of the magnetic fluid. On the outer circle surface of the rotation shaft 31 is attached a magnet ring 36 at the position corresponding to the magnetic fluid seal 27 so that a magnetic path with each magnet 27a is formed via the magnet ring 36.

In the above mentioned embodiment, the radial bearing 24 is formed of a metallic steel material whose thermal expansion coefficient is smaller than that of copper alloy while the rotation shaft 31 is formed of a metallic steel material having a linear expansion coefficient of 9–12PPM/° C. In this way, the thermal expansion coefficients of the shaft and bearing are set nearly equal. As for the steel material, one can use nickel alloy steels such as a stainless steel and Fe—Ni alloy (invar) which are an alloy steel containing chrome. One can also use a tool steel which is an alloy steel containing chrome and used for knives and tools, a bearing steel used for a ball bearing and the like, a free-machining steel used for mechanical components and the like, an alloy steel such as structural steel, or a carbon steel such as a carbon tool steel used for mechanical components. A sintering method may also be used for producing the above mentioned steel materials. In this case, plating for anti-corrosion may be done on the surface of the steel materials in order to improve corrosion resistance. This method may be used for other materials as well. If the steel material having a smaller thermal expansion coefficient than that of copper alloy is used, the bearing clearance becomes slightly narrower at high temperature and becomes slightly wider at low temperature, thus canceling the influence of the viscosity fluctuation of the lubricant fluid, consequently stabilizing the bearing operation compared to the bearing made of copper alloy. In this way, excellent temperature resistance and bearing properties are obtained.

The working layer A for providing hydrodynamic pressure generating grooves on the inner circle surfaces of the radial bearings 24 and 24, is formed of copper or copper alloy which is easy to machine, so the efficiency of machining and the precision for the inner circle surface of the bearing and the hydrodynamic pressure generating grooves and the abrasion resistance for the bearing are improved as a result of eliminating "galling" and "burning."

Note that in the above mentioned embodiment, the working layer A is formed by plating or depositing on the inner circle surface of the bearing 24 to constitute the bearing; however, a ternary alloy plating which mixes another substance may be used.

The above embodiment described the example in which herringbone-configured hydrodynamic pressure generating grooves are formed on the side of the bearing as a hydrodynamic pressure generating means, but the grooves can be formed on the outer circle surface of the shaft. In that case, a working layer A for forming the hydrodynamic pressure generating grooves on the outer circle surface of the shaft is formed of copper or copper alloy as mentioned above. Also, the hydrodynamic pressure generating grooves can be applied to the thrust bearing as spiral grooves.

The above mentioned embodiment described the example in which the working layer A is formed by plating or depositing, but it can be formed by other methods as well. For example, the working layer A can be formed by fitting a cylindrical pipe material (sleeve member) to the inner circle surface of the bearing 24 or to the outer circle surface of the rotation shaft 31.

FIG. 2 illustrates an embodiment in which the working layer A is constructed with a cylindrical pipe material to make a sleeve and is fitted to the inner circle surface of the bearing 24. The basic configuration for the spindle motor of FIG. 2 remains the same as the embodiment of FIG. 1, so the same components are coded identical and the detailed description is omitted.

In the embodiment illustrated in FIG. 2, the radial bearing 45 comprises a hollow cylindrical outer sleeve portion 45a and an inner sleeve portion 45b fixed in the inner circle of the outer sleeve portion 45a; both members 45a and 45b are bonded concentrically by shrink fitting or adhesive. The outer sleeve portion 45a is formed of a metallic material whose linear expansion coefficient is smaller than that of a copper containing material, such as the mentioned alloy steel containing chrome, alloy steel containing nickel, or steel material of carbon steel; the inner sleeve portion 45b is formed of a copper containing material such as copper or copper alloy which is easy to machine. In this embodiment, the outer sleeve portion 45a is formed of a free-machining steel (SUM24L and the like) with an 8 mm outer diameter and a 4 mm inner diameter while the inner sleeve portion 45b is formed of phosphor bronze (C2200T and the like) with a 4 mm outer diameter and a 3.5 mm inner diameter. The proportion for the thickness between the outer sleeve portion 45a and inner sleeve portion 45b is at 10 to 1. On the inner circle surface of the inner sleeve portion 45b is formed a pair of hydrodynamic bearing sections 47 and 47 in parallel to provide hydrodynamic surfaces, and at the center area on the inner surface of the inner sleeve portion 45b is formed an annular concavity 45c which divides both the hydrodynamic bearing sections 47 and 47 in the axial direction. The bearing clearance at each of the hydrodynamic bearing sections 47 and 47, that is, the space between the hydrodynamic surface of the inner sleeve portion 45b and the rotation shaft 31, is set to be (unilateral) $2\mu m$; and on the hydrodynamic surface of the inner sleeve portion 45b is formed a group of hydrodynamic pressure generating grooves having $7\mu m$ of depth while the entire thickness of the inner sleeve portion 45b in the hydrodynamic bearing section 47 is 0.25 mm. The group of hydrodynamic pressure generating grooves can be grooves of any shapes as long as they generate radial hydrodynamic pressure; various shapes can be adopted.

The radial bearing 45 is installed in the bearing holder 22 on the frame 1 side, followed by the final machining on the bottom of the bearing holder 22 and the work on the inner surface of the inner sleeve portion 45b during the final machining of the hydrodynamic surfaces when the group of hydrodynamic pressure generating grooves and the annular concavity 45c are formed.

According to the above embodiment of a hydrodynamic bearing apparatus and its manufacturing method, even when the environmental temperature changes due to a temperature rise and the like caused by high speed spinning, the level of enlargement/shrinkage of the bearing can be reduced because the outer sleeve portion 45a of the radial bearing 45 is made of a material having a smaller linear expansion coefficient than that of a copper containing material. Also, the inner sleeve portion 45b, in which internal machining is provided on the hydrodynamic surface and the like, is made of a copper containing material which is easy to machine; therefore, easy and precise machining is provided; especially the precision for surface roughness, flatness, and the like, can be obtained easily on the hydrodynamic surface.

In the embodiment illustrated in FIG. 2, at the opening of the bearing holder 22, illustrated at the upper end in the figure is arranged a hollow cylindrical annular seal magnet 40 for preventing the lubricant fluid 10 from leaking to the outside. The inner circle wall of the annular seal magnet 40 is made to be a tapered wall 40a of which the distance in the radius direction with respect to the outer circle wall of the rotation shaft 31 is continuously widened outwardly (upwardly in the figure); the lubricant fluid 10 in the hydrodynamic bearing section 47 is filled, without interruption, from the bottom (the lower surface in the figure) of the bearing holder 22 up to half way in the axial direction of the tapered wall 40a of the annular seal magnet 40. If the tapered wall 40a which opens outwardly is formed as a sealing section 48 such that the curvature ratio of the liquid surface constituting a liquid-vapor boundary of the lubricant fluid 10 changes as it is pushed outward. This change in curvature ratio works as a resisting force against the lifting force from the fluid, consequently suppressing the upward movement of the fluid, thus functioning as the sealing section 48 for the lubricant fluid 10.

The annular seal magnet 40 is magnetized with an inward magnetic orientation (downward in the figure). Therefore, with the magnetizing distribution, the lubricant fluid 10 is prevented from moving the liquid surface outwardly. Further, on the outer end of the annular seal magnet 40 (the upper end in the figure), a seal cover comprised of a ring plate member is provided close to the outer circle surface of the rotation shaft 31 and fixed thereon to prevent the magnetic fluid 10 from diffusing outside. With this, the lubricant fluid 10 is also prevented from leaking outside, and dust and the like are prevented from entering from outside.

Moreover, on the outer surface of the seal cover 44 and on the inner surface of the hub 33 opposite the outer surface of the seal cover 44, oil absorbing members 50 and 50 are provided for absorbing any lubricant fluid 10 that may diffuse. For each oil absorbing member 50, for example, felt or non-woven cloth, as well as a porous substance such as a sintered metal having an increased porosity, sponge, and the like, can be used; and these two members face each other to form a narrow path. However, it is preferable to use the one which does not out gas even when being heated.

The hydrodynamic bearing apparatus illustrated in FIG. 3 is an example in which the bearing holder 22 for holding the radial bearing 45 and the frame 1 are formed integrally and are made of an aluminum containing material, and at one end (bottom in the figure) of the inner sleeve portion 45b of the radial bearing 45 in the axial direction, a flange portion 45d is formed integrally, which extends in the radius direction from the shaft end of the inner sleeve portion 45b. The flange portion 45d is dish-shaped with the size and shape covering the shaft end surface of the outer sleeve portion 45a; the outer periphery of the flange portion 45d contacts the inner circle surface of the bearing holder 22 on the frame 1 side. If the flange portion 45d is formed integrally in such a way that it extends from the shaft end of the inner sleeve portion 45b in the radius direction to contact the inner circle surface of the bearing holder 22, the hydrodynamic bearing apparatus can be manufactured as follows. After installing the radial bearing 45 in the bearing holder 22, the bottom opening of the bearing holder 22 can be finished by machining for mounting the thrust receiving plate 25, followed by machining the inner surface of the inner sleeve portion 45b of the radial bearing 45. In this case, if the bearing holder 22 on the frame 1 side and the inner sleeve portion 45b of the radial bearing 45 are form of the material which is easy to machine, that is, an aluminum containing material and a copper containing material respectively, both are machined easily and precisely, and then the flange portion 45d of the radial bearing 45 is machined without changing the tool used for machining the bearing holder 22, further machining the inner surface of the inner sleeve portion 45b. Therefore, according to this embodiment, the inner surfaces on the frame 1 side and on the radial bearing 45 side are finished continuously and effectively without changing the tools.

Note that the process for providing hydrodynamic grooves on the inner surface of the inner sleeve portion 45b is done by machining, but also can be done by component rolling or other process methods. The finishing work for the inner surface of the inner sleeve portion 45b can be done by not only machining but also by etching.

Further, the embodiment illustrated in FIG. 3 uses the flange portion 45d which is extended in the radius direction from the inner sleeve portion 45b of the radial bearing 45; however, the flange portion 45d may also be extended to the bottom inner surface of the bearing holder 22 so that it covers the inner circle surface of the bearing holder 22 which is exposed in the embodiment of FIG. 3. If the flange portion 45d is further extended to cover the bottom inner circle surface of the bearing holder 22 in this way, the portion from the bottom opening of the bearing holder 22 can be constituted of a copper containing material which is easy to machine; the material used for the bearing holder 22 on the frame 1 side does not need to be easy to machine, thus providing a wide range for selecting the material for the bearing holder 22.

The above mentioned embodiment is an example in which the cylindrical sleeve, as the working layer A, is fitted to the inner circle surface of the bearing 24. However, the cylindrical sleeve portion may also be fitted to the outer circle surface of the rotation shaft 31 and the hydrodynamic pressure generating grooves may be formed on the rotation shaft side on the cylindrical sleeve material.

In this case, the rotation shaft is constituted with a center portion made of the material having a smaller linear expansion coefficient than that of a copper containing material and an outer sleeve portion, made of a copper containing material, which is formed on the outer periphery of the center portion. On the outer circle surface of the outer sleeve portion, a pair of hydrodynamic pressure generating grooves formed in parallel in the axial direction and a concave section which divides both hydrodynamic pressure generating grooves in the axial direction, can be formed. When the rotation shaft 31 is constituted with an outer sleeve portion made of a copper containing material which is fixed to the outer periphery of the center portion, forming a hub 33 fixed on the rotation shaft 31 of an aluminum containing material makes it possible, the same as in the above mentioned embodiment, to machine the outer sleeve portion of the rotation shaft 31 and the hub 33. This widens the variety of materials than can be used in manufacturing which reduces manufacturing effort.

When forming the working layer A with the sleeve member in this way, the working layer A can be made of copper or of copper alloy such as Cu (copper), Cu—Al alloy (aluminum bronze and the like), Cu—Sn alloy (bronze), Cu—Sn—P alloy (phosphorous bronze and the like), Cu—Si—Sn alloy (silicon bronze and the like), Cu—Ni—Zn alloy (German silver and the like), Cu—Ni—Fe alloy (nickel and the like), Cu—Be alloy (berylium copper and the like), Cu—Zn alloy (bronze and the like). When forming the working layer A by plating or depositing, the material used for the working layer A needs to be capable of being plated or deposited. If the working layer A is formed with the sleeve member, the usable material varies, widening the variety of material selection. Note that the thickness of the sleeve member may be set to be 10–100$\mu$m in the same manner as the working layer formed by plating or deposition.

The above mentioned embodiment described a shaft-rotation-type spindle motor, but it also can be applied to a journal-type motor. FIG. 4 shows an embodiment in which this invention is applied to a journal type motor, wherein a hollow cylindrical supporting holder 52 is formed of iron alloy or aluminum on a frame 51, and the stator assembly 2 of the motor is mounted on the outer periphery of the supporting holder 52. Also, the rotor assembly 3 of the motor has the hub 33 for supporting a disk, which is rotatably supported by a journal 54 via a pair of radial hydrodynamic bearings 53a constituted at the center portion.

A pair of the radial hydrodynamic bearing sections 53a are formed on the inner circle surface of the inner sleeve portion 53 of the bearing fixed on the inner periphery 33c of the hub 33 which corresponds to the outer sleeve portion of the bearing in FIG. 2. The inner sleeve portion 53 of the bearing has the annular concavity 53b which divides the hydrodynamic bearing sections 53a in the axial direction and is bonded by shrink fitting or adhesive on the inner periphery 33c of the hub 33 which is the outer sleeve portion of the bearing.

In the same manner as described already for this embodiment, the journal 54 and the hub 33 constituting the outer sleeve portion of the bearing are formed of steel material such as alloy steel or carbon steel having a smaller linear expansion coefficient than that of a copper containing material; the inner sleeve portion 53 is formed, of a copper containing material which is easy to machine. If the hub 33 is formed of a steel material whose linear expansion coefficient is smaller than that of a copper containing material and a soft magnetic material is selected for the material, the hub 33 can be formed integral with the outer sleeve portion of the bearing; the back yoke 34 of the motor used in the embodiment of FIG. 2 may be omitted. With this, a rotor magnet 35 can be directly held by the hub 33, and at the same time, the miniaturization of the motor can be achieved.

In the embodiment illustrated in FIG. 4, mid-way toward the top of the journal 54, ring shaped thrust plate 55 is fixed constituting two thrust hydrodynamic bearing sections 55a and 55b. By interposing the thrust plate 55 between the upper surface of the inner periphery 33c of the hub 33 and a thrust pressing plate 56 fixed by screws on the hub 33, the two thrust hydrodynamic bearing sections 55a and 55b are constituted between the facing surfaces respectively. At the lower side of the lower radial hydrodynamic bearing section 53a and at the upper side of the upper thrust hydrodynamic bearing section 55a, capillary seal sections 57a and 57b, having a tapered surface equivalent to the tapered wall 40a of the seal section 48 illustrated in FIG. 2 are formed. A lubricant for the hydrodynamic bearing completely fills the space between the capillary seal sections 57a and 57b including the hydrodynamic bearing section without breaks.

The inner sleeve portion 53 in the above mentioned embodiment is provided for forming the radial bearing sections; however, on the top of the inner sleeve portion 53, a flange portion as illustrated in FIG. 3 can be formed outwardly in the radial direction, and the thrust hydrodynamic pressure generating grooves can be provided thereon. In addition, the inner sleeve portion can be extended upwardly to reduce the manufacturing effort.

Figure 5:
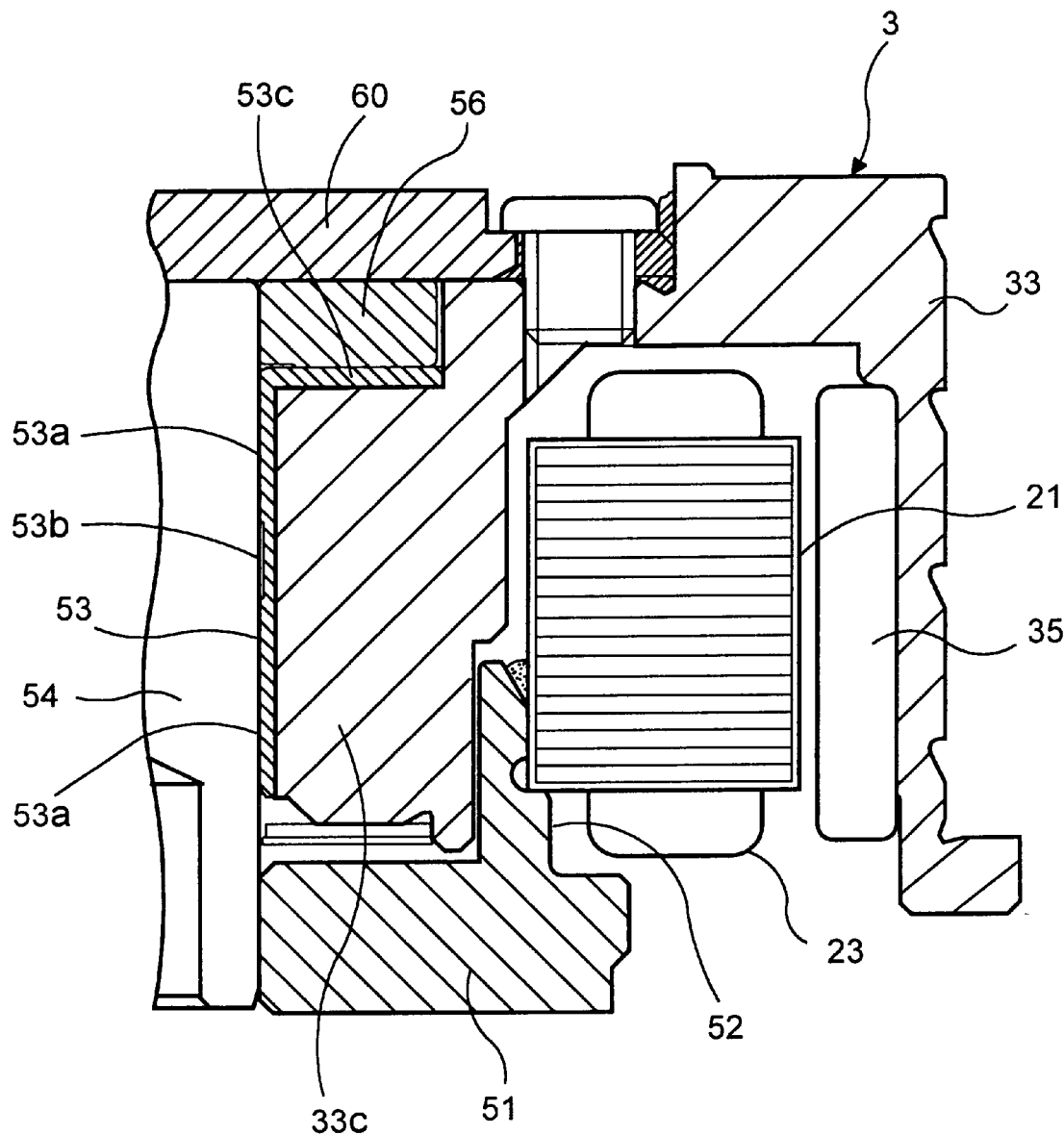
FIG. 5 is a horizontal cross-sectional view illustrating a modification of the embodiment of FIG. 4.

Furthermore, the journal-type motor illustrated in FIG. 4 can be constituted, as illustrated in FIG. 5, in which the thrust pressing plate 60 fixed to the hub 33 by screws is put as a lid between the journal 54 and the top of the inner periphery 33c of the hub 33 on the bearing side, to seal the top, and only its bottom needs a seal section for the lubricant fluid. Note that in the embodiment illustrated in FIG. 5, the flange portion 53c is formed on the top of the inner sleeve portion 53, outwardly in the radial direction, and the thrust hydrodynamic pressure generating grooves are formed thereon.

The above mentioned embodiment illustrates an example of the hydrodynamic bearing apparatus applied to a spindle motor for driving a magnetic disk; however, the hydrodynamic bearing apparatus of this invention is, of course, applicable to motors other than that for driving a magnetic disk.

A hydrodynamic bearing apparatus of this invention is constructed such that members on which hydrodynamic pressure generating grooves are formed are made of a metallic material whose thermal expansion coefficient is smaller than that of a copper containing material which may be copper or a copper alloy which is easy to machine, and on the hydrodynamic surface side of said metallic material is formed a working layer of hydrodynamic pressure generating grooves. Therefore, compared to the use of copper alloy for the bearing and the like, the material can reduce the damage due to the bearing clearance fluctuation and the viscosity changes in a lubricant fluid. As a result, the fluctuations in hydrodynamic pressure and bearing loss due to the change in environmental temperature can be largely reduced, improving the bearing properties. Moreover, because the members, on which the hydrodynamic pressure generating grooves are formed, are made of copper or copper alloy, a good machinability can be obtained, thus providing precise and easy machining of the inner surface of the bearing and the hydrodynamic pressure generating grooves. For this reason, the wearing down due to "galling" and "burning" which occurs when a motor is driven can be prevented, improving productivity and reliability of the hydrodynamic bearing apparatus.

Also, forming a working layer with a sleeve member provides more materials which can be used than forming the working layer by plating or deposition, providing a wide range of selecting the materials from copper or copper alloys. As a result, one can select a material superior in abrasion resistance and machinability.

Furthermore, according to the manufacturing method of a hydrodynamic bearing apparatus in this invention, when machining the frame side and the bearing for finishing work, one can machine the inner sleeve portion made of a copper containing material using the same tool used for an aluminum frame and the like to proceed to the inner surface of the inner sleeve portion. Thus, the frame side and the bearing can be effectively machined without switching tools, thus improving the processability and productivity in manufacturing the bearing apparatus.

While the foregoing description and drawings represent the preferred embodiments of the present invention, it will be obvious to those skilled in the art that various changes and modifications may be made therein without departing from the true spirit and scope of the present invention.

What is claimed is:

1. A hydrodynamic bearing apparatus comprising:
   a shaft and a bearing having facing hydrodynamic surfaces therebetween;
   hydrodynamic pressure generating grooves being disposed on at least one of the facing hydrodynamic surfaces of said shaft and bearing;
   said apparatus relatively rotatably supporting said shaft and bearing via the hydrodynamic pressure from a lubricant fluid filled between said facing hydrodynamic surfaces;
   one of said shaft and said bearing, on which said hydrodynamic pressure generating grooves are formed, being made of a metallic material whose thermal expansion coefficient is smaller than that of a copper containing material; and
   a working layer made of said copper containing material being formed on the hydrodynamic surface of said metallic material, said surface of said working layer functioning as the hydrodynamic surface, said hydrodynamic pressure generating grooves being formed on said working layer.

2. The hydrodynamic bearing apparatus of claim 1, wherein said copper containing material is selected from a group consisting of copper and a copper alloy.

3. A hydrodynamic bearing apparatus according to claim 2, wherein said copper alloy is selected from the group consisting of a Cu—Sn alloy, a Cu—Ni alloy, a Cu—Zn alloy and a Cu—Zn—Sn alloy.

4. A hydrodynamic bearing apparatus according to claim 3, wherein said working layer is formed by one of plating and deposing and the thickness thereof is within the range of 10–100 $\mu$m.

5. A hydrodynamic bearing apparatus according to claim 1, wherein said working layer is formed thicker than the depth of said hydrodynamic pressure generating grooves.

6. A hydrodynamic bearing apparatus according to claim 1, wherein said metallic material whose thermal expansion coefficient is smaller than that of said containing copper containing material is a steel material, and the side opposite the hydrodynamic surface having hydrodynamic pressure generating grooves is also made of a steel material wherein said steel material is an alloy steel.

7. A hydrodynamic bearing apparatus according to claim 1, wherein said metallic material whose thermal expansion coefficient is smaller than that of said containing copper containing material is a steel material, and the side opposite the hydrodynamic surface having hydrodynamic pressure generating grooves is also made of a steel material wherein said steel material is a carbon steel.

8. A hydrodynamic bearing apparatus comprising:
   a shaft and a bearing having facing hydrodynamic surfaces therebetween;
   hydrodynamic pressure generating grooves being disposed on at least one of the facing hydrodynamic surfaces of said shaft and said bearing;
   said apparatus relatively rotatably supporting said shaft and bearing via the hydrodynamic pressure from a lubricant fluid filled between said facing hydrodynamic surfaces;

one of said shaft and said bearing, on which said hydrodynamic pressure generating grooves are formed, being made of a metallic material whose thermal expansion coefficient is smaller than that of a copper containing material; and a sleeve member made of said copper containing material being formed on the hydrodynamic surface of said metallic material to form a working layer, said working layer having a surface which functions as the hydrodynamic surface, said hydrodynamic pressure generating grooves being formed on said working layer.

9. The hydrodynamic bearing apparatus of claim 8, wherein said copper containing material is selected from a group consisting of copper and a copper alloy.

10. A hydrodynamic bearing apparatus according to claim 8, wherein said metallic material whose thermal expansion coefficient is smaller than that of said copper containing material is a steel material, and the side opposite the hydrodynamic surface having hydrodynamic pressure generating grooves is also made of a steel material wherein said steel material is an alloy steel.

11. A hydrodynamic bearing apparatus according to claim 8, wherein said metallic material whose thermal expansion coefficient is smaller than that of said copper containing material is a steel material, and the side opposite the hydrodynamic surface having hydrodynamic pressure generating grooves is also made of a steel material wherein said steel material is a carbon steel.

12. A hydrodynamic bearing apparatus according to claim 8, wherein said sleeve member is made of a metal selected from the group consisting of a Cu, a Cu—Al alloy, a Cu—Sn alloy, a Cu—Sn—P alloy, a Cu—Si—Sn alloy, a Cu—Ni—Zn alloy, a Cu—Ni—Fe alloy, a Cu—Be alloy and a Cu—Zn alloy.

13. A hydrodynamic bearing apparatus comprising:

a shaft and a bearing having facing hydrodynamic surfaces therebetween;

hydrodynamic pressure generating grooves being disposed on at least one of the facing hydrodynamic surfaces of said shaft and said bearing positioned circumferentially;

said apparatus relatively rotatably supporting said shaft and bearing via the hydrodynamic pressure from a lubricant fluid filled between said facing hydrodynamic surfaces;

said bearing being constructed with an outer sleeve portion made of a material whose linear expansion coefficient is smaller than that of a copper containing material and with an inner sleeve portion made of a copper containing material and secured on an inner circle of said outer sleeve portion; and a pair of hydrodynamic pressure generating grooves arranged in parallel in the axial direction together with a concavity which divides said both hydrodynamic pressure generating grooves in the axial direction being formed on said inner circle surface of said inner sleeve portion.

14. A hydrodynamic bearing apparatus according to claim 13, wherein said outer sleeve portion and said shaft are made of a steel material which is made of one of an alloy steel and carbon steel, and said inner sleeve portion is made of one of copper and a copper alloy.

* * * * *